US012659398B2

(12) United States Patent
Jung

(10) Patent No.: US 12,659,398 B2
(45) Date of Patent: Jun. 16, 2026

(54) MOBILE COMMUNICATION TERMINAL CUSTOMIZING PLATFORM, AND SERVICE METHOD THEREOF

(71) Applicant: SLASH B SLASH Co., Ltd, Busan (KR)

(72) Inventor: Yong Chae Jung, Seongnam-si (KR)

(73) Assignee: SLASH B SLASH CO., LTD (KR)

( * ) Notice: Subject to any disclaimer, the term of this patent is extended or adjusted under 35 U.S.C. 154(b) by 285 days.

(21) Appl. No.: 18/495,746

(22) Filed: Oct. 26, 2023

(65) Prior Publication Data

US 2025/0080641 A1 Mar. 6, 2025

(30) Foreign Application Priority Data

Aug. 28, 2023 (KR) ........................ 10-2023-0112628

(51) Int. Cl.
*H04M 1/72448* (2021.01)
*G06F 3/0486* (2013.01)
*H04M 1/72466* (2021.01)

(52) U.S. Cl.
CPC ...... *H04M 1/72448* (2021.01); *G06F 3/0486* (2013.01); *H04M 1/72466* (2021.01)

(58) Field of Classification Search
CPC . G06F 3/0486; H04M 1/0203; H04M 1/0283; H04M 1/72448; H04M 1/7246; H04M 1/72466; Y02P 90/30
See application file for complete search history.

(56) References Cited

U.S. PATENT DOCUMENTS

2005/0213934 A1* 9/2005 Kinjo ..................... H04N 5/765
386/E5.002

FOREIGN PATENT DOCUMENTS

| JP | 2003099406 A | 4/2003 |
| JP | 2003296612 A | 10/2003 |
| JP | 2004086514 A | 3/2004 |
| JP | 2007026427 A | 2/2007 |

(Continued)

OTHER PUBLICATIONS

A complete English translation along with the original of the Korean Application Publication KR 20210132968 A to Shin Kyung. (Year: 2021).*

*Primary Examiner* — Nader Bolourchi

(74) *Attorney, Agent, or Firm* — Renaissance IP Law Group LLP

(57) ABSTRACT

Provided is a mobile communication terminal customizing platform and a service method thereof. The mobile communication terminal customizing platform includes: a contents registration unit for registering contents to be provided to a user terminal; a customization processing unit for receiving contents selection data from the user terminal, requesting a manufacturer server to print an image of the received contents selection data on a case mounted on the user terminal, storing case data by matching identification information to be embedded in the printed image and selected contents data, and guiding whether or not to distribute the printed image to the user terminal; and a contents providing unit for receiving a request for contents from the user terminal equipped with the case, recognizing the identification information embedded in the case, searching for contents data corresponding to the recognized identification information, and providing the searched contents to the user terminal.

5 Claims, 2 Drawing Sheets

200

(56)　　　　　　　References Cited

FOREIGN PATENT DOCUMENTS

| JP | 2014203355 | A | 10/2014 |
| KR | 101946505 | B1 | 1/2019 |
| KR | 102465064 | B1 | 11/2022 |
| KR | 20230049904 | A | 4/2023 |

* cited by examiner

<u>200</u>

1

MOBILE COMMUNICATION TERMINAL CUSTOMIZING PLATFORM, AND SERVICE METHOD THEREOF

BACKGROUND

Technical Field

The present inventive concept relates to a mobile communication terminal customizing platform and a service method thereof, particularly, to a mobile communication terminal customizing platform, which can customize the interior and exterior of a mobile communication terminal using contents of an image desired by a user.

Background of the Related Art

Recently, distribution of mobile communication terminals such as smartphones is generalized. Accordingly, the number of users who desire to express their personality different from those of others while using mobile communication terminals of the same or similar models is increasing. That is, the demand for contents that may reveal personality of terminal users through a mobile communication terminal is increasing.

Conventional contents for mobile communication terminals are focused on the contents used inside the mobile communication terminals. Since the contents are not revealed to the outside, they are not sufficient to express personality of a user.

Meanwhile, accessories for mobile communication terminals such as a case or the like are provided in various forms to express personality of an individual. Since these accessories are limited to the shape of a mobile communication terminal, the accessories are generally designed to transform a part of the terminal rather than the entire terminal.

However, conventional mobile communication terminals and accessories are separately implemented and do not interoperate with each other. Therefore, it is required to provide a service that allows a user to more conveniently customize the interior and exterior of the mobile communication terminals.

(Patent Document 0001) KR 10-1946505 B1

SUMMARY

Therefore, the present inventive concept has been made in view of the above problems, and it is an object of the present inventive concept to provide a mobile communication terminal customizing platform and a service method thereof, which can customize the interior and exterior of a mobile communication terminal using contents of an image desired by a user.

To accomplish the above object, according to one aspect of the present inventive concept, there is provided a mobile communication terminal customizing platform comprising: a contents registration unit for registering contents to be provided to a user terminal; a customization processing unit for receiving contents selection data from the user terminal, requesting a manufacturer server to print an image of the received contents selection data on a case corresponding to the user terminal, storing case data by matching identification information to be embedded in the printed case and selected contents data, and guiding whether or not to distribute the printed case to the user terminal; and a contents providing unit for receiving a request for contents from the user terminal equipped with the case, recognizing the identification information embedded in the case, searching for contents data corresponding to the recognized identification information, and providing the searched contents to the user terminal.

In an embodiment, the identification information may include a period of using the contents, and use of the contents provided to the user terminal may be stopped when the period of using the contents expires.

In an embodiment, the contents registration unit may receive modified contents from the user terminal and register the modified contents as new contents, and distribute a profit of the new contents to the user terminal when the user terminal provides the registered new contents.

In an embodiment, the contents providing unit may provide an intellectual property (IP) of corresponding contents and a template based thereon to the user terminal, the template may include a designated area and a modifiable area through the IP, contents may be modified by the user terminal in a form desired by a user on the basis of the provided template, and the template of the modified contents may have a modifiable area designated by a registrant of the modified contents.

According to another aspect of the present inventive concept, there is provided a mobile communication terminal customizing service method comprising the steps of: registering contents to be provided to a user terminal; receiving contents selection data from the user terminal, requesting a manufacturer server to print an image of the received contents selection data on a case corresponding to the user terminal, storing case data by matching identification information to be embedded in the printed case and selected contents data, and guiding whether or not to distribute the printed case to the user terminal; receiving a request for contents from the user terminal equipped with the case, recognizing the identification information embedded in the case, searching for contents data corresponding to the recognized identification information, and providing the searched contents to the user terminal; and receiving modified contents from the user terminal and registering the modified contents as new contents, and distributing a profit of the new contents to the user terminal when the user terminal provides the new contents, wherein the identification information includes a period of using the contents, use of the contents provided to the user terminal is stopped when the period of using the contents expires, the contents providing step provides an intellectual property of corresponding contents and a template based thereon to the user terminal, the template includes a designated area and a modifiable area through the IP, contents are modified by the user terminal in a form desired by a user on the basis of the provided template, and the template of the modified contents has a modifiable area designated by a registrant of the modified contents.

As the mobile communication terminal customizing platform and a service method thereof according to an embodiment of the present inventive concept may customize the interior and exterior of a mobile communication terminal by printing contents of an image desired by a user on an external case of the mobile communication terminal and conveniently applying the contents to the internal display of the mobile communication terminal at the same time, personality of the user may be highlighted diversely.

In addition, as the mobile communication terminal customizing platform and a service method thereof according to an embodiment of the present inventive concept stops using contents provided to the user terminal when the use period included in the identification information expires, and thus may encourage the user to purchase other contents or limit the use of the contents to specific events or the like, profits of service providers can be increased.

In addition, as the mobile communication terminal customizing platform and a service method thereof according to an embodiment of the present inventive concept provides an IP and a template based thereon to be modified by a user, the range of contents that can be actually used may be expanded as individual customization is allowed while using the same IP.

In addition, as the mobile communication terminal customizing platform and a service method thereof according to an embodiment of the present inventive concept allows a user to modify a provided template and register as new contents, and thus new contents are continuously updated, the range of selection of the user can be expanded.

In addition, as the mobile communication terminal customizing platform and a service method thereof according to an embodiment of the present inventive concept distributes a predetermined amount of profit to a user when the user registers new contents, customizing services can be activated by improving users' motivation of participation.

DETAILED DESCRIPTION OF THE PREFERRED EMBODIMENT

Figure 1:
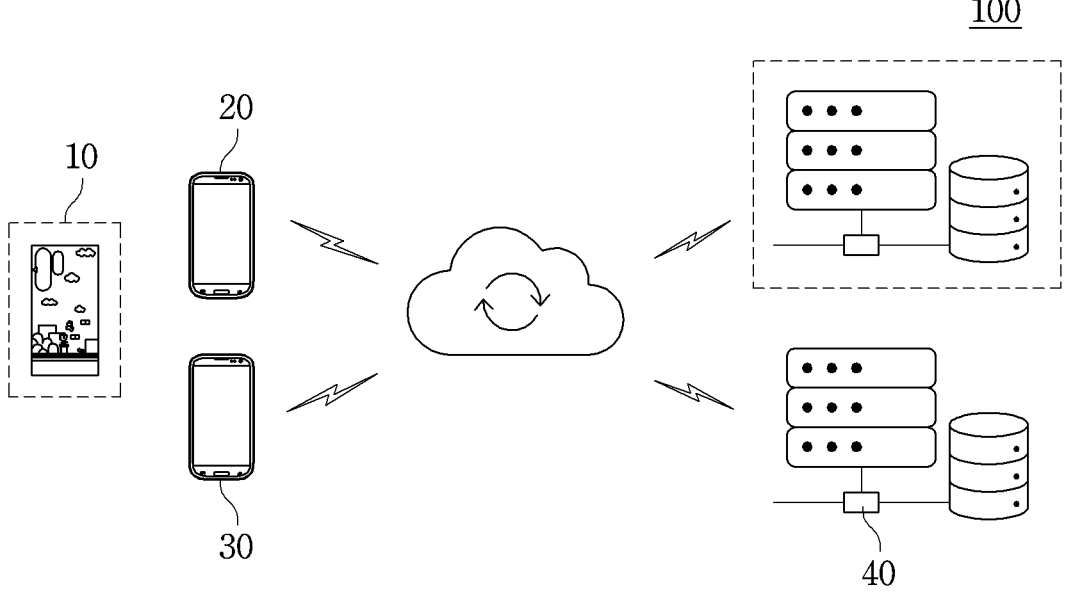
FIG. 1 is a view showing the configuration of service of a mobile communication terminal customizing platform according to an embodiment of the present inventive concept.

Hereinafter, embodiments of the present inventive concept will be described in detail with reference to the attached drawings so that those skilled in the art may easily implement the present inventive concept. The present inventive concept may be implemented in various different forms and is not limited to the embodiments described herein. Parts not related to the description are omitted from the drawings to clearly explain the present inventive concept, and identical or similar components are given the same reference numerals throughout the specification.

Hereinafter, a mobile communication terminal customizing platform and a service method thereof according to an embodiment of the present inventive concept will be described in more detail with reference to the drawings.

FIG. 1 is a view showing the configuration of service of a mobile communication terminal customizing platform according to an embodiment of the present inventive concept.

Referring to FIG. 1, a service system of a mobile communication terminal customizing platform 100 according to an embodiment of the present inventive concept may include the mobile communication terminal customizing platform 100, a user terminal 20, a contents developer terminal 30, and a manufacturer server 40. Here, a case 10 may be mounted on the user terminal 20. At this point, the case 10 with contents printed thereon may be distributed through the mobile communication terminal customizing platform 100 and the manufacturer server 40.

The mobile communication terminal customizing platform 100 may register contents from the contents developer terminal 30.

At this point, the mobile communication terminal customizing platform 100 may store the contents registered from the contents developer terminal 30 in a database, and update and inquire the contents. Here, the registered contents are contents to be applied to the user terminal 20 and printed on the case 10, and may include free contents, pay contents, and subscribing contents. In addition, the registered contents may be contents modified and newly registered by a user. The contents registered from a plurality of contents developer terminals 30 may form a template pool.

In addition, the mobile communication terminal customizing platform 100 may register new contents, i.e., existing contents modified by the user terminal 20. At this point, the mobile communication terminal customizing platform 100 may distribute profits generated by distributing the contents to users who have become contents developers.

As described above, as the mobile communication terminal customizing platform 100 according to an embodiment of the present inventive concept distributes a predetermined amount of profit to a user when the user registers new contents, customizing services can be activated by improving users' motivation of participation.

The case 10 may be a case with contents printed thereon by a manufacturer, which are selected by the user terminal 20 from the mobile communication terminal customizing platform 100. The case 10 may be custom-tailored by a manufacturer according to the contents selected by the user terminal from the mobile communication terminal customizing platform 100. At this point, the user may receive the case 10 from the manufacturer by courier or at an offline store linked to the mobile communication terminal customizing platform 100.

The user terminal 20 may be a mobile communication terminal of a user who uses the service of the mobile communication terminal customizing platform 100. In addition, the user terminal 20 may customize the interior and exterior of the mobile communication terminal as the user selects contents from a corresponding template pool. At this point, when the case 10 is mounted on the user terminal 20, the internal display of the user terminal 20 may be customized as contents corresponding to the identification information are automatically applied through an NFC function.

As described above, as the mobile communication terminal customizing platform 100 according to an embodiment of the present inventive concept may customize the interior and exterior of a mobile communication terminal by printing contents of an image desired by a user on an external case of the mobile communication terminal and conveniently applying the contents to the internal display of the mobile communication terminal at the same time, personality of the user may be highlighted diversely.

In addition, the user terminal 20 may modify the contents selected by the user and register the contents in the mobile communication terminal customizing platform 100 as new contents. In this case, the user terminal 20 may function as a contents developer terminal 30.

As described above, as the mobile communication terminal customizing platform 100 according to an embodiment of the present inventive concept allows a user to modify a provided template and register as new contents, and thus new contents are continuously updated, the range of selection of the user can be expanded.

The user terminal 20 may modify the contents received from the platform. When the case 10 is mounted on the user terminal 20, contents corresponding to the identification information is applied, and therefore, the internal display of the user terminal 20 may be customized. The provided contents may include a designated area and a modifiable area. The user terminal 20 may edit contents by combining a plurality of contents only within a modifiable area of the contents.

The contents developer terminal 30 may be a mobile communication terminal of a contents developer who manufactures and registers contents in the mobile communication terminal customizing platform 100. The contents developer terminal 30 may be a wired terminal such as a desktop computer, as well as a portable terminal such as a smartphone, a notebook computer, or the like.

When the user terminal 20 selects contents, the manufacturer server 40 may receive a request for printing the contents on the case from the mobile communication terminal customizing platform 100. At this point, the manufacturer server 40 may receive information on the contents selected by the user and the model name or terminal type of the user terminal 20 collected by the mobile communication terminal customizing platform 100. Manufacturing the case may be accomplished by determining the type of the user terminal 20, determining the basic shape of the case, determining and combining design elements based on information on the contents, and delivering a product to the user after manufacturing. Here, the manufacturer may print a character on the case 10 using a 3D printer or a robot designed for manufacturing the case.

Figure 2:
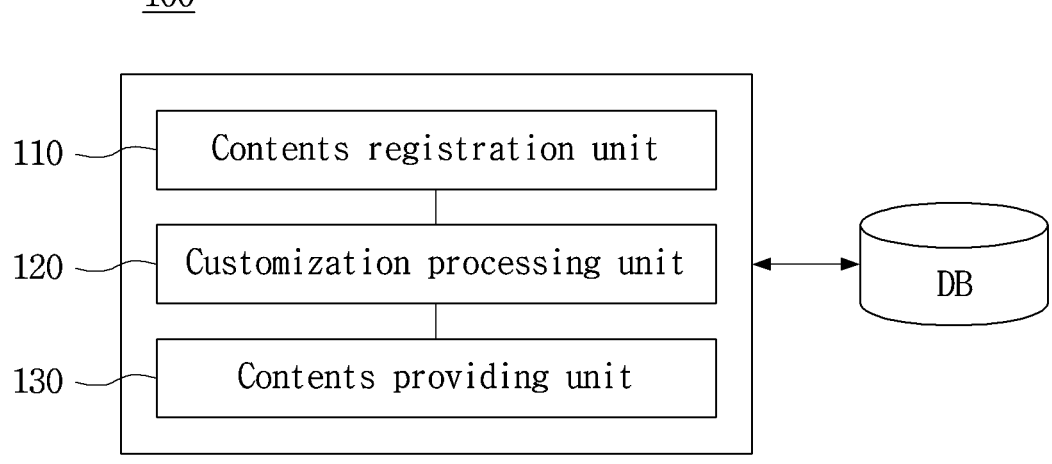
FIG. 2 is a block diagram showing a mobile communication terminal customizing platform according to an embodiment of the present inventive concept.

FIG. 2 is a block diagram showing a mobile communication terminal customizing platform 100 according to an embodiment of the present inventive concept.

Referring to FIG. 2, the mobile communication terminal customizing platform 100 may include a contents registration unit 110, a customization processing unit 120, and a contents providing unit 130.

The contents registration unit 110 may register contents to be provided to the user terminal 20. Here, the content registration unit 110 may register contents from the contents developer terminal 30. In addition, the contents registration unit 110 may register modified contents from the user terminal 20. When the user terminal 20 receives contents and partially modifies or combines the contents on the basis of a template to create modified contents, the contents registration unit 110 may register again the modified contents as new contents.

The customization processing unit 120 may print the contents selected by the user terminal 20 on a case corresponding to the user terminal 20 and distribute the case to the user. At this point, when the user terminal 20 selects the contents, the customization processing unit 120 may provide an interface to the user terminal 20 to select a plurality of contents in a drag and drop method.

The customization processing unit 120 may request the manufacturer server 40 to print the contents selected by the user terminal 20 on a case corresponding to the user terminal 20. Here, the customization processing unit 120 may assign identification information corresponding to the contents and request the manufacturer server 40 to embed the identification information in the case 10. For example, the manufacturer may embed the identification information in the case 10 using an NFC function. The identification information may provide information for using the contents to the user terminal 20. For example, the identification information may include a period capable of using the contents. When the period of using the contents expires, use of the contents and the modified contents provided by utilizing the contents in the user terminal 20 may be stopped.

As described above, as the mobile communication terminal customizing platform 100 according to an embodiment of the present inventive concept stops using contents provided to the user terminal 20 when the use period included in the identification information expires, and thus may encourage the user to purchase other contents or limit the use of the contents to specific events or the like, profits of service providers can be increased.

The customization processing unit 120 may guide whether or not to distribute the printed case 10 to the user terminal 20. That is, when printing of the case 10 and input of the identification information are completed by the manufacturer server 40, the customization processing unit 120 may receive corresponding information and guide it to the user terminal 20. Here, the case 10 may be embedded with identification information related to the contents.

The contents providing unit 130 may provide contents corresponding to the case 10 to the user terminal 20. At this point, the contents providing unit 130 may provide an IP and a template of corresponding contents to the user terminal 20. Here, the IP may be a character icon implemented in association with the copyright information of the contents. The template may be divided into an area that can be modified by the user terminal 20 and an area that cannot be modified. The contents providing unit 130 may provide customization contents that can be modified and applied by the user in a limited manner in the user terminal 20 by selecting an IP through the template of the contents.

The contents providing unit 130 may receive a request for contents from the user terminal 20 equipped with the case 10. At this point, the contents providing unit 130 may recognize the identification information embedded in the case 10. The contents providing unit 130 may inquire contents data corresponding to the case 10 from the database and transmit the contents to the user terminal 20.

As described above, as the mobile communication terminal customizing platform 100 according to an embodiment of the present inventive concept provides an IP and a template based thereon to be modified by a user, the range of contents that can be actually used may be expanded as individual customization is allowed while using the same IP.

Figure 3:
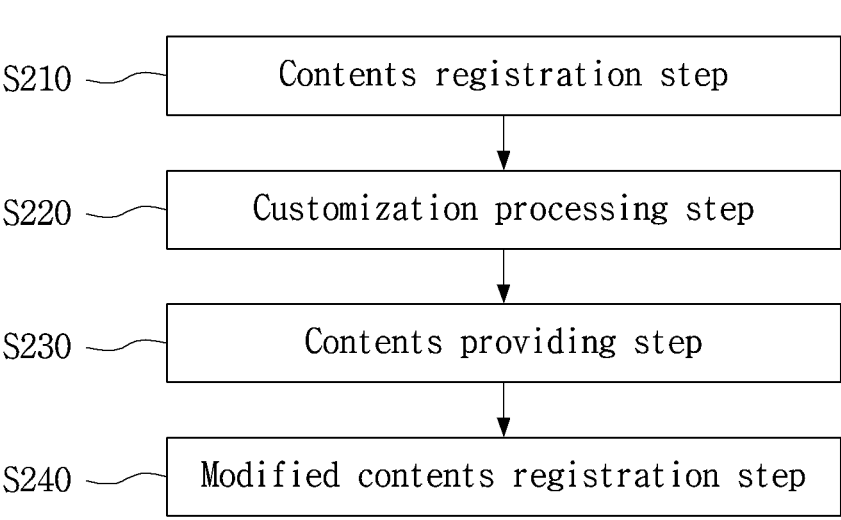
FIG. 3 is a flowchart illustrating a mobile communication terminal customizing service method according to an embodiment of the present inventive concept.

FIG. 3 is a flowchart illustrating a mobile communication terminal customizing service method according to an embodiment of the present inventive concept.

Referring to FIG. 3, a mobile communication terminal customizing service method 200 may include a contents registration step (S210), a customization processing step (S220), a contents providing step (S230), and a modified contents registration step (S240).

First, the mobile communication terminal customizing platform 100 registers contents that the user desires to use in his or her case 10 and the user terminal 20 as contents to be provided to the user terminal 20 (step S210). Here, the mobile communication terminal customizing platform 100 may register contents from the contents developer terminal 30. The contents registered from the contents developer terminal 30 are stored in the database of the mobile communication terminal customizing platform 100 and may be updated and inquired. Here, the contents registered in the mobile communication terminal customizing platform 100 may include free contents, pay contents, and subscribing contents.

Next, the mobile communication terminal customizing platform 100 customizes a case corresponding to the contents selected by the user terminal 20 and distributes the case to the user (step S220). At this point, when the user terminal 20 selects the contents, the mobile communication terminal customizing platform 100 may provide an interface to the user terminal 20 to select a plurality of contents in a drag and drop method.

More specifically, the mobile communication terminal customizing platform 100 may request the manufacturer server 40 to print the contents selected by the user terminal 20 and a case corresponding to the type of the user terminal 20. Here, the mobile communication terminal customizing platform 100 may request the manufacturer server 40 to embed identification information in the case using an NFC function. The identification information may include a period capable of using the contents. When the period of using the contents expires, use of the contents and the modified contents provided by utilizing the contents in the user terminal 20 may be stopped.

As described above, as the mobile communication terminal customizing service method 200 according to an embodiment of the present inventive concept stops using contents provided to the user terminal 20 when the use period included in the identification information expires, and thus may encourage the user to purchase other contents or limit the use of the contents to specific events or the like, profits of service providers can be increased.

In addition, the mobile communication terminal customizing platform 100 may guide whether or not to distribute the printed case 10 to the user terminal 20. That is, when printing of the case 10 and input of the identification information are completed by the manufacturer server 40, the mobile communication terminal customizing platform 100 may receive corresponding information and guide it to the user terminal 20. The case 10 may be embedded with identification information related to the contents. When whether or not to distribute the case 10 is determined, the user may receive the case 10 by courier or at an offline store that implements the mobile communication terminal customizing platform 100.

Next, the mobile communication terminal customizing platform 100 receives a request for contents from the user terminal 20 equipped with the case 10, recognizes the identification information embedded in the case 10, searches for contents data corresponding to the recognized identification information, and provides the searched contents to the user terminal 20 (step 230). Here, the mobile communication terminal customizing platform 100 may provide an IP and a template of corresponding contents to the user terminal 20. Here, the IP may be a character icon implemented in association with the copyright information of the contents. The template may be divided into an area that can be modified by the user terminal 20 and an area that cannot be modified. The mobile communication terminal customizing platform 100 may provide customization contents that can be modified and applied by the user in a limited manner in the user terminal 20 by selecting an IP through the template of the contents.

Next, the mobile communication terminal customizing platform 100 registers modified contents created by the user terminal 20 by selecting, combining, and modifying contents in the mobile communication terminal customizing platform 100 (step S240). When the user terminal 20 registers new contents by modifying existing contents, the mobile communication terminal customizing platform 100 may distribute profits generated by distributing the contents to corresponding users.

As described above, as the user terminal 20 provides contents so as to be modified, the mobile communication terminal customizing service method 200 according to an embodiment of the present inventive concept may expand the range of contents that can be actually used as individual customization is allowed while using the same IP.

Preferred embodiments according to the present inventive concept have been described above, and it is obvious to those skilled in the art that the present inventive concept can be embodied in other specific forms, in addition to the embodiments described above, without departing from the spirit or scope of present inventive concept. Therefore, the embodiments described above should be regarded as illustrative rather than restrictive, and accordingly, the present inventive concept is not limited to the above description, but may be modified within the scope of the appended claims and their equivalents.

| DESCRIPTION OF SYMBOLS | |
|---|---|
| 10: Case | 20: User terminal |
| 30: Contents developer terminal | 40: Manufacturer server |
| 100: Custom platform for mobile communication terminal | |
| 110: Contents registration unit | 120: Customization processing unit |
| 130: Contents providing unit | |

What is claimed is:

1. A mobile communication terminal customizing platform comprising:

a contents registration unit for registering contents to be provided to a user terminal;

a customization processing unit for receiving contents selection data from the user terminal, requesting a manufacturer server to print an image of the received contents selection data on a case mounted on the user terminal, storing case data by matching identification information to be embedded in the printed image on the case and selected contents data, and guiding whether or not to distribute the printed image on the case to the user terminal; and a contents providing unit for receiving a request for contents from the user terminal equipped with the case, recognizing the identification information embedded in the case, searching for contents data corresponding to the recognized identification information, and providing the searched contents to the user terminal.

2. The platform according to claim 1, wherein the identification information includes a period of using the contents, and use of the contents provided to the user terminal is stopped when the period of using the contents expires.

3. The platform according to claim 1, wherein the contents registration unit receives modified contents from the user terminal and registers the modified contents as new contents, and distributes a profit of the new contents to the user terminal when the user terminal provides the registered new contents.

4. The platform according to claim 1, wherein the contents providing unit provides an intellectual property (IP) of the searched contents and a template based thereon to the user terminal, the template includes a designated area and a modifiable area through the IP, contents are modified by the user terminal in a form desired by a user on the basis of the provided template, and a template of the modified contents has a modifiable area designated by a registrant of the modified contents.

5. A mobile communication terminal customizing service method comprising the steps of:

registering contents to be provided to a user terminal;

receiving contents selection data from the user terminal, requesting a manufacturer server to print an image of the received contents selection data on a case mounted on the user terminal, storing case data by matching identification information to be embedded in the printed image on the case and selected contents data, and guiding whether or not to distribute the printed image on the case to the user terminal;

receiving a request for contents from the user terminal equipped with the case, recognizing the identification information embedded in the case, searching for contents data corresponding to the recognized identification information, and providing the searched contents to the user terminal; and receiving modified contents from the user terminal and registering the modified contents as new contents, and distributing a profit of the new contents to the user terminal when the user terminal provides the new contents, wherein the identification information includes a period of using the contents, use of the contents provided to the user terminal is stopped when the period of using the contents expires, the contents providing step provides an intellectual property (IP) of the searched contents and a template based thereon to the user terminal, the template includes a designated area and a modifiable area through the IP, contents are modified by the user terminal in a form desired by a user on the basis of the provided template, and a template of the modified contents has a modifiable area designated by a registrant of the modified contents.

* * * * *